Oct. 7, 1941.   G. SLAYTER ET AL.   2,257,767
APPARATUS FOR THE MANUFACTURE OF GLASS FIBERS
Filed March 10, 1938   4 Sheets-Sheet 1

James Slayter AND
J.H. Thomas
INVENTORS

BY Rule & Hoge
ATTORNEYS.

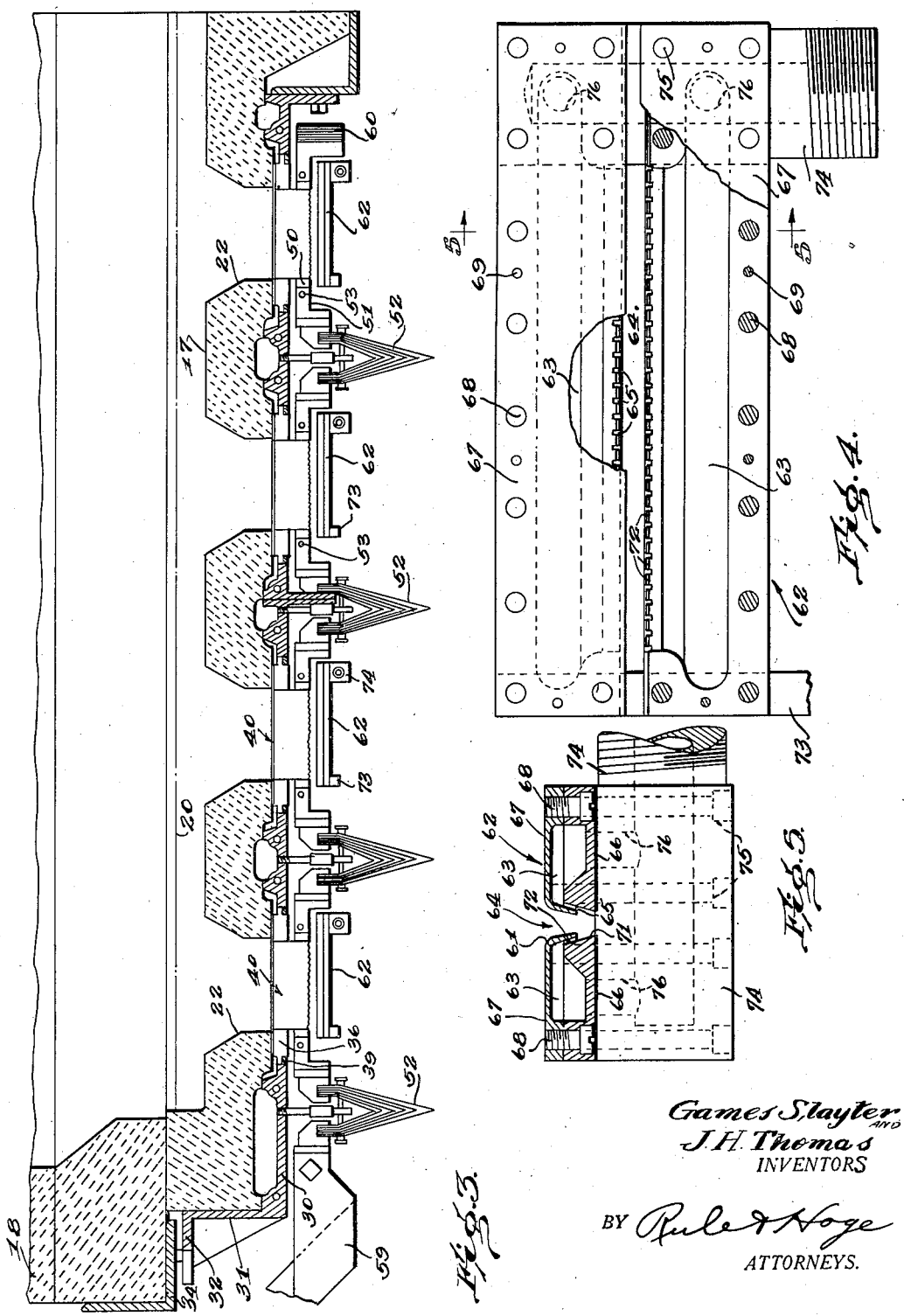

Oct. 7, 1941.   G. SLAYTER ET AL   2,257,767
APPARATUS FOR THE MANUFACTURE OF GLASS FIBERS
Filed March 10, 1938   4 Sheets-Sheet 3
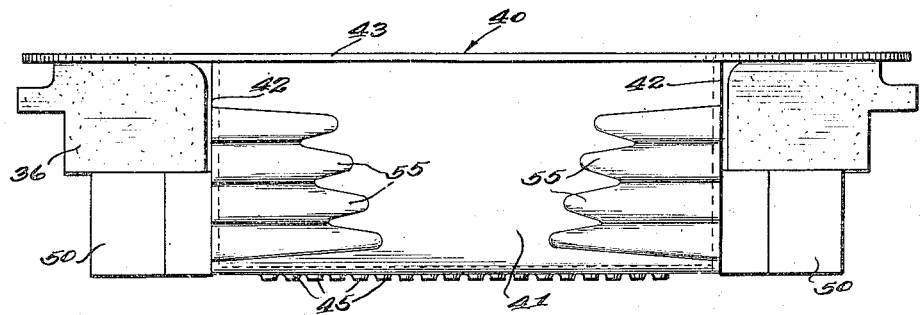
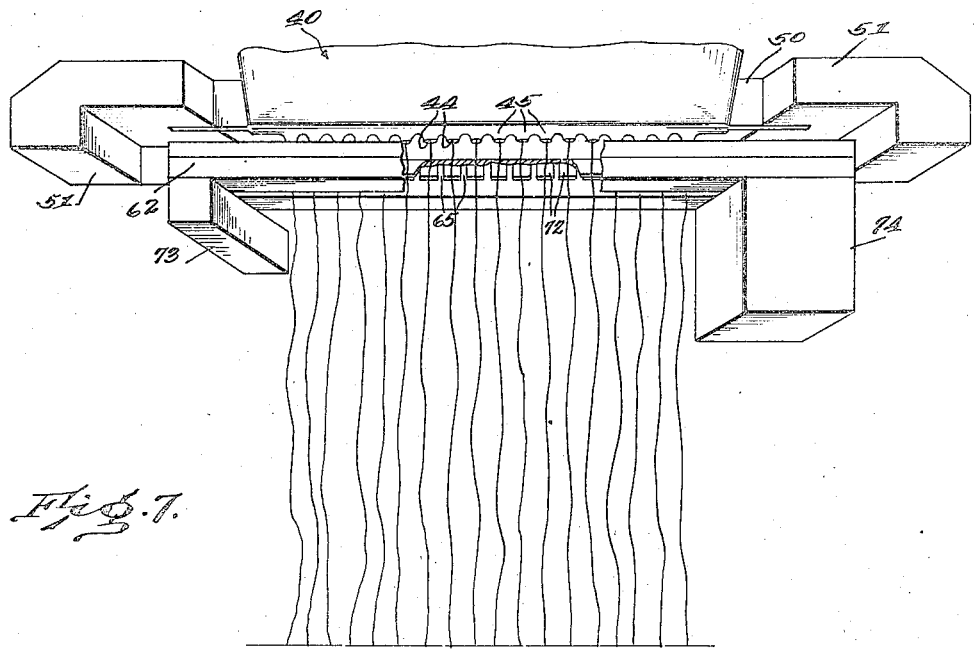
Games Slayter
J. H. Thomas
INVENTORS
BY Rule & Hoge
ATTORNEYS.

Oct. 7, 1941.  G. SLAYTER ET AL  2,257,767
APPARATUS FOR THE MANUFACTURE OF GLASS FIBERS
Filed March 10, 1938  4 Sheets—Sheet 4
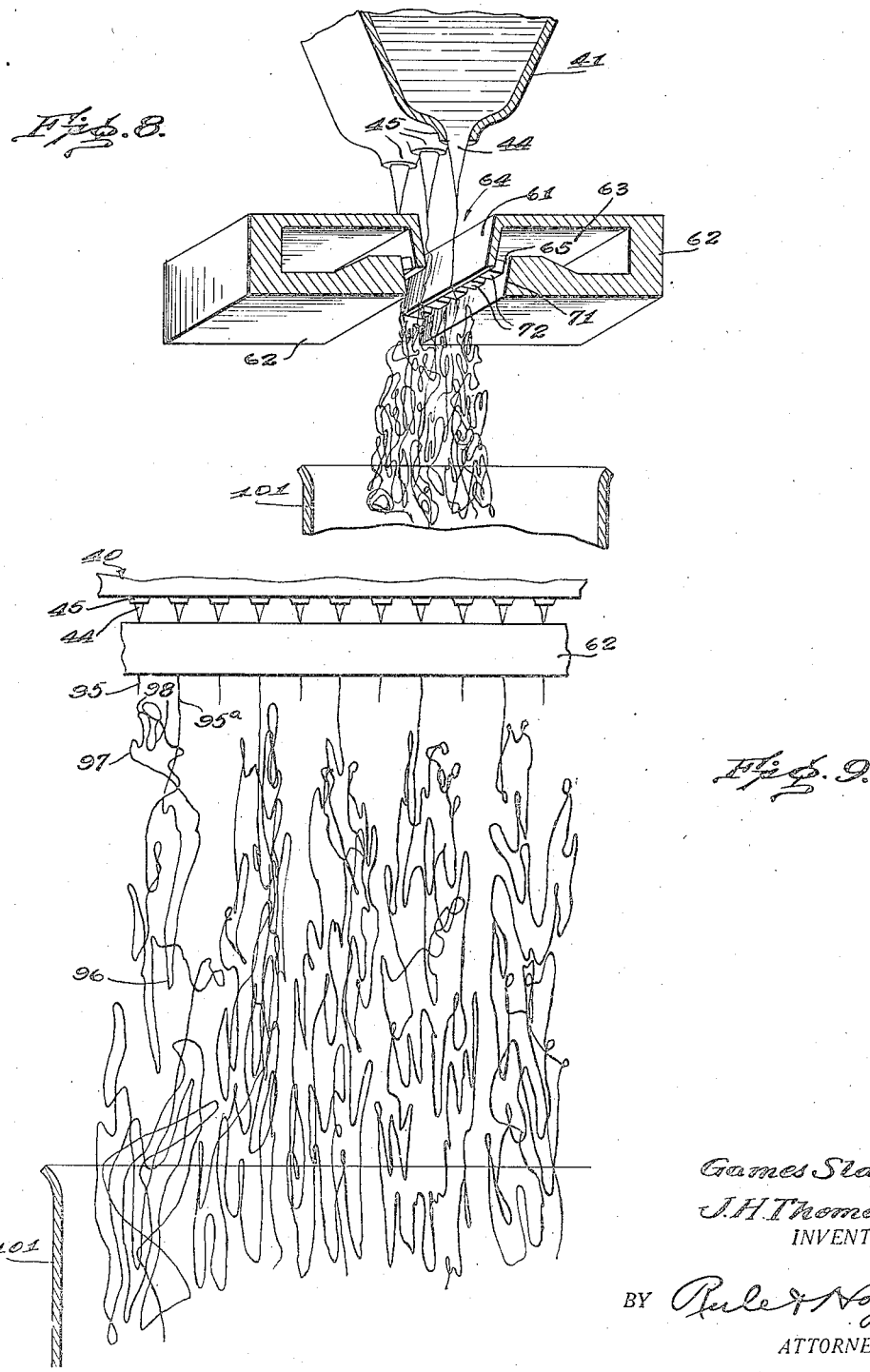
James Slayter
J. H. Thomas
INVENTORS
BY Rule & Hoge
ATTORNEYS.

Patented Oct. 7, 1941

2,257,767

UNITED STATES PATENT OFFICE 2,257,767

APPARATUS FOR THE MANUFACTURE OF GLASS FIBERS

Games Slayter and John H. Thomas, Newark, Ohio, assignors, by mesne assignments, to Owens-Corning Fiberglas Corporation, a corporation of Delaware Application March 10, 1938, Serial No. 195,066

7 Claims. (Cl. 49—55)

The present invention relates to methods and apparatus for reducing molten glass or a like material to fine fibers. The apparatus herein disclosed is designed for making glass fibers by methods which comprise flowing the molten glass in small streams from furnace outlets, drawing the streams to attenuated fibers by means of powerful blasts of steam, air or other gas, and causing the fibers to solidify as they are drawn and accumulate.

An object of the invention is to provide a practical form of apparatus by which fine glass fibers, particularly fibers of microscopic fineness, may be rapidly produced and accumulated, and which fibers have great flexibility, tensile strength, resistance to breaking or shattering, and other desirable characteristics.

A further object of the invention is to provide a novel form of apparatus by which various distinct methods of making fine fibrous glass may be practiced, and by which glass fibers may be produced which have different characteristics, dependent upon the particular method employed. For example, by one such method, very fine, substantially straight fibers of great length may be continuously drawn and accumulated. The fiber diameter size may be regulated and controlled within desirable ranges, as, for example, from about .0001 inch to .1 inch in diameter, more or less, as required. The finer fibers, in practice, generally running about .0002 inch to .0003 inch, are extremely fine and flexible, have a soft, silky feel, and have also been discovered to have an elasticity which facilitates manipulation and fabrication into textile articles.

By adjustments in the apparatus and conditions involved, the method of operation may be changed to produce a substantially different product in which the fibers may be more or less built up into irregular shapes, intermingled and matted together, resulting in a product commonly known as glass wool, and when the fibers are of extreme fineness, sometimes referred to as glass cotton. Such products are particularly adapted for heat and sound insulation in its various forms.

A primary object of the invention is to provide a novel and practical form of apparatus by which a large number of glass fibers may be simultaneously produced and rapidly accumulated. Heretofore, fibrous glass has commonly been made by a mechanical drawing process in which the individual fibers are drawn and wound on a drum or the like as they are formed. This is a comparatively slow process and is further incapable of producing fibers of great fineness. It is not a continuous process, as the fibers frequently break between the furnace and the winding drum, and manual aid is required to reestablish the drawing operation.

Another method which has been more recently employed to a limited extent consists in flowing a small stream of vitreous glass through an annular blower and drawing it by the force of a steam blast or the like to a fine filament. This is necessarily a slow process. Multiplication of such blowers to any extent is also impractical, owing to the large amount of space required for the blowers, the small number that could be used at any one time with a single furnace, the practical difficulty or impossibility of maintaining for all the blowers the uniformity of temperature, and other conditions which would be necessary for a satisfactory simultaneous operation. Moreover, when feeding a single glass stream into such a blower, it has been conventional to use a thick viscous stream, which when acted upon by the annular blast, was disrupted and atomized into a multiplicity of relatively short fibers, each of said fibers having a knob-like head and a tail projecting therefrom. The stream was shattered and blasted and was caused to branch along its length into a multiplicity of short length fibers. Such methods commonly produce a large amount of shot and also result in a lack of uniformity of fiber diameter.

The present invention provides means for overcoming these difficulties, such means being embodied in a practical form of apparatus with which a large number of streams of glass, compactly arranged, may be supplied from a single furnace feeder, combined with means for maintaining the necessary uniformity of temperature and other conditions required for the simultaneous and continuous formation of fibers from all of said streams.

A further difficulty which has been found in an attempt to flow a multiplicity of glass streams through electrically heated metal bushing liners or the like, relates to the unequal heating or temperature conditions at different outlets. An aim of our invention is to overcome this difficulty by providing novel means for regulating the electrical resistance at different points of the bushing liner or feeder, and distributing the flow of electrical current in a manner to cause a uniform temperature at all the feeder outlets.

A further novel feature of the invention relates to the use of a plurality of feeders or bushing liners compactly arranged and electrically connected in series, with provision for obtaining an equalized electrical heating of all the feeders. The invention also provides a novel arrangement of burners individual to the bushing liners for heating the supply body of glass overlying the bushings together with means for individually adjusting the burners or heating means in a manner to obtain substantially uniform temperature of the glass supplied at the different bushing liners.

A further object of the invention is to provide an arrangement of gas blasts which facilitates the attenuation of the individual glass streams with minimum consumption of steam or gas. In this connection it is desired to facilitate the entry of the individual glass streams into the steam blast. In producing this effect, we have provided an open pattern of steam, into which surrounding atmospheric gases are easily induced and the glass streams are enabled to be seized by the steam and readily attenuated into long fine fibers.

Other objects and advantages of the present invention will become apparent from the following description taken in conjunction with the drawings in which:

Fig. 3 is a fragmentary, cross-sectional, elevational view of the fiberizing apparatus, in part diagrammatic, taken along the line 3—3 of Fig. 2;

Fig. 4 is a detail plan view of a blower, parts thereof being broken away for the sake of clarity;

Fig. 5 is a cross-sectional elevational view of a blower, the section being taken along the line 5—5 of Fig. 4;

Fig. 6 is a detailed elevational view of a metal feeder and a refractory support therefor;

Fig. 7 is a diagrammatic, perspective view of a fiberizing unit, parts being broken away for the sake of clarity, illustrating the straight pulling method;

Fig. 8 is a cross-sectional diagrammatic perspective view of a fiberizing unit illustrating the whipping action method of fiberizing; and Fig. 9 is an elevational fragmentary view of a fiberizing unit also illustrating the whipping action method of production.

Figure 1:
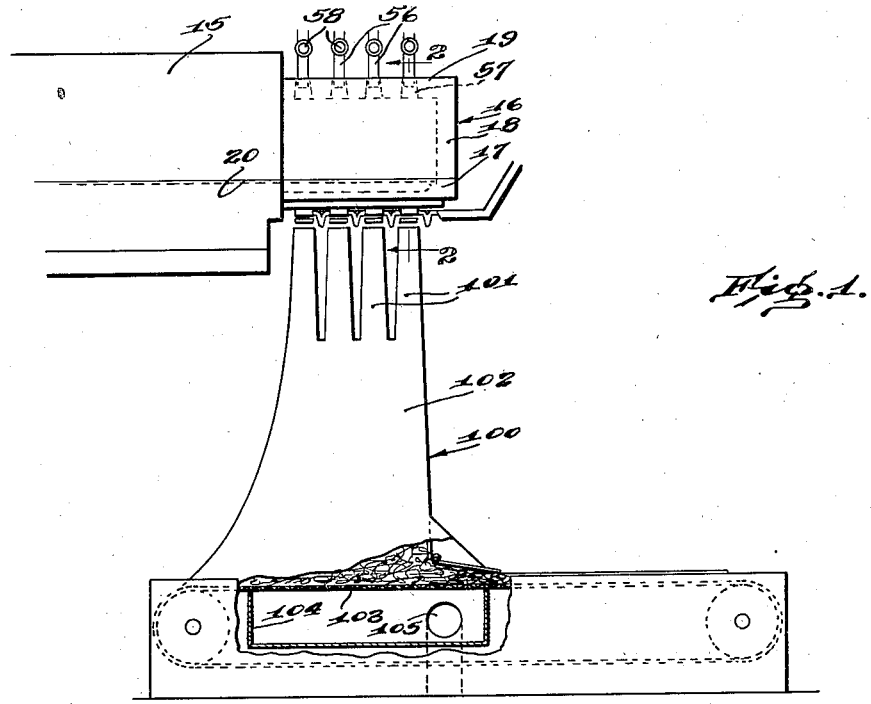
Fig. 1 is a diagrammatic elevational view of an apparatus for producing glass wool and accumulating it into mat formation in accordance with the present invention.

Referring more particularly to the drawings, molten glass is continuously supplied from a furnace tank 15 which may be of conventional construction and which is provided with a forehearth 16. The forehearth comprises a floor 17, side walls 18 and arched roof 19, all made of refractory material providing a closed heat chamber over the glass body 20. The floor 17 is recessed to form a channel 21 in which a head of glass is continuously maintained over a series of outlet openings or wells 22 formed in and extending through the floor 17. The wells 22 are preferably elongated or oval in horizontal section. The walls of the wells 22 have their upper portions tapered downwardly.

The wells or openings 22 in the floor 17, as shown, are arranged in two groups or rows on opposite sides of and parallel with the center line or main axis of said floor. As shown, there are four openings in each row although, of course, more rows or more openings in each row may be provided. Underlying the floor 17 is a ribbed bottom plate 30, the marginal portions 31 of which extend upwardly to surround the floor 17 and are formed with a horizontal flange 32. The bottom plate 30 is connected by suitable means to angle bars 34 which embrace the lower outer corners of the walls 18.

The bottom plate 30 is provided with openings 35 in register with the openings 22 to receive refractory bushings 36 directly beneath and in register with the openings 22. Each bushing 36 is provided with a metal supporting ring 39. The bushing is supported and held in place by metal clips 37 secured by bolts 38 to the bottom of the plate 30.

Associated with each refractory bushing 36 is a bushing liner 40, herein referred to generally as a feeder. The feeder is in the form of a V-shaped trough or well and constitutes a container for the molten glass which supplies the flowing stream. It comprises downwardly converging or tapered side walls 41 (see Fig. 6) and vertical end walls 42. The liner also includes an upper marginal flange 43 which overlies and substantially covers the top surface of the refractory bushing 36. The flange portion 43 is clamped between the bushing 36 and the floor 17 of the forehearth. Each bushing liner 40 is provided with a multiplicity of bottom outlet openings 44 which are shown arranged in a straight row along the bottom of the liner. Through these openings the molten glass flows in continuously streams, the liner thus forming a multiple outlet feeder.

The feeder is made of a metal or metal alloy such as platinum or a platinum alloy which is capable of withstanding the high temperature to which it is subjected and the abrasive action of the flowing glass and which, moreover, is chemically inert to the action of the molten glass. We have found that a platinum-rhodium alloy containing about 90% platinum and 10% rhodium gives very satisfactory results. Other alloys, of course, may be used such as platinum, iridium, rhodium and/or gold or the like. It is also possible to use other alloys, as, for example, those of nickel steel alloys, Nichrome alloys or the like.

The outlet openings 44 are formed in nozzles or nipples 45 which protrude downwardly below the bottom face of the feeder. The inner contours of the nipples 45 are preferably rounded and downwardly converging in order to provide a smooth, streamlined flow for the glass and to eliminate as far as possible the tendency to form drops or thick and thin spots during the flow of the glass.

The outlet openings are necessarily quite small to permit the glass to issue in the small streams required for making fine glass fibers. We have found in practice that the diameters of the outlet may range from about .03 inch to about .175 inch, the exact size depending upon the diameter of fibers it is desired to produce and other variable factors.

In order to maintain a flow of glass through small outlets, such as above indicated, we have found it most desirable to use metal liners. Outlets through refractory bushings are not suitable generally for this purpose as they quickly clog, owing to the glass becoming chilled at the outlet. Any attempt to maintain the refractory at the high temperature necessary to prevent such freezing and clogging, would result in erosion and rapid wear. Moreover, the refractory material is a relatively poor heat conductor and renders the delicate application of heat to the outlet orifices difficult.

The metal liners or feeders herein shown are electrically heated to maintain them at a high temperature, usually about equal to that of the glass flowing therethrough. In this manner the issuing glass leaves the feeder outlets at the required high temperature. The electrical heating also insures a free and continuous flow of the glass without danger of clogging the outlets by the glass becoming chilled. The metal alloy provides a surface over which the glass flows smoothly and without apparent friction.

The use of the metal liners and electrical heating means by which a normally continuous free flow of the glass is maintained, also provides conditions which permit the flow to be automatically reestablished if interrupted. Thus, for example, if a small bubble or seed is entrained in the flowing stream, it may cause a disruption of the stream, particularly in view of the fact that there is a partial vacuum created in the region of the outlet orifice, so that such an entrained bubble may expand and break the continuity of the stream at the feeder outlet. This causes a momentary contraction and accumulation of the issuing glass beneath the outlet, but the stream flow is promptly reestablished by the force of the blast. The high temperature of the outlet orifice walls prevents congealing of the glass in a manner to clog the outlet.

Each feeder 40 is provided with a strainer 46 consisting of wire mesh screens and which may be made of the same material as the feeder. The screen is placed over the mouth of the feeder and welded to the flange 43. The mesh of the screen 46 is of sufficient fineness to prevent passage of stones or pieces of refractory which would clog the openings 44.

It is found that the taper or flare of the feeder side walls 41 has a material effect on the rate of flow of the glass. Too great a divergence of the side walls is objectionable as it results in a material reduction in the rate of flow, and also unduly increases the screen area. If, on the other hand, the walls are too steep, the flow is also restricted and this restriction is further increased by the retarding action of the screen 46 due to its decreased area. We have found that satisfactory results are obtained with the walls 41 tapered at an angle of about 20° to the vertical, or a total divergence of about 40°, plus or minus a few degrees but preferably not many.

In order to maintain a tight seal between the refractory bushing 36 and the floor 17 of the furnace, there is provided means for water-cooling the margin of the refractory and overlying metal liner. For this purpose the refractory bushing is formed with a marginal recess 48 in its upper surface to receive a pipe 49 which surrounds the bushing, and when the parts are assembled, surround the outer margin of the metal flange 43. Water or other cooling medium is circulated through the pipes 49, as hereinafter described. This causes a localized chilling action by which seepage of the glass between the flange 43 and the adjoining refractory is positively prevented, and a tight seal is maintained.

The metal liners or feeder 43 are formed with integral lugs or extensions 50 (see Fig. 6) at their opposite ends which are gripped by metal bifurcated clips 51 or clamping blocks which electrically unite the feeders with connectors 52, which are preferably built up of a plurality of flexible metal sheets adapted to yield as the feeders change their size due to heat changes. (See Fig. 3.) Clamping screws 53 may be provided to secure the lugs 50 in the bifurcated clips 51.

It is found that in attempting to electrically heat a metal bushing, liner or feeder of the character above described by passing an electrical current therethrough, there is a substantial variation in the temperature at different points, and particularly at the different outlets, if the metal walls are of uniform thickness throughout. The temperature is usually considerably higher in the areas adjoining the connector bars or lugs 50. If the temperature is not uniform at all the outlets, it results in a variation in the size of stream flow and temperature of the glass issuing from the different outlets. This prevents satisfactory operation as it does not permit the uniformity of diameters of the resultant fibers which is required for textiles and various other glass fiber products. Moreover, the temperature requirements permitting fine glass fibers to be drawn, are exacting, and satisfactory results can only be obtained within narrow limits as to temperature or viscosity of the issuing glass.

In order to provide a uniform temperature of the feeder at all the outlets and also to control the path of current flow through the feeder walls and thereby localize to a certain extent the electrical heating at the outlets, we have provided temperature regulating means as follows. The thickness of each side wall 41 of the feeder is made to vary at different points, being graduated in a manner to secure the desired current distribution. The preferred method of obtaining this graduation consists in integrally uniting with the sheet metal walls and covering predetermined areas thereof, electrical conducting elements 55 by which the walls are thickened, and their electrical conductivity increased in the current flow direction.

These conductors or low resistance elements 55 may be made of wire consisting of the same metal or alloy as the walls of the feeder. Short pieces of the wire are welded to the walls 41. These strips 55, as shown, are preferably graduated and successively decreased in length from the lowermost to the top in crows-foot formation. By this arrangement the current flow is so directed that the greater portion of the heating takes place along the outlets. The electrical resistance is also reduced at the junctures of the lugs at the ends of the feeder, so that the tendency to overheat at these points is overcome and a substantially equal temperature is maintained at all the outlets.

Electric current for heating the feeders 40 may be supplied from any suitable source as by a transformer (not shown) communicating with the feeders in series through the bus bars 59, connectors 52, the feeders 40 and a connector bar 60 by which the two groups of feeders are connected in series.

Figure 2:
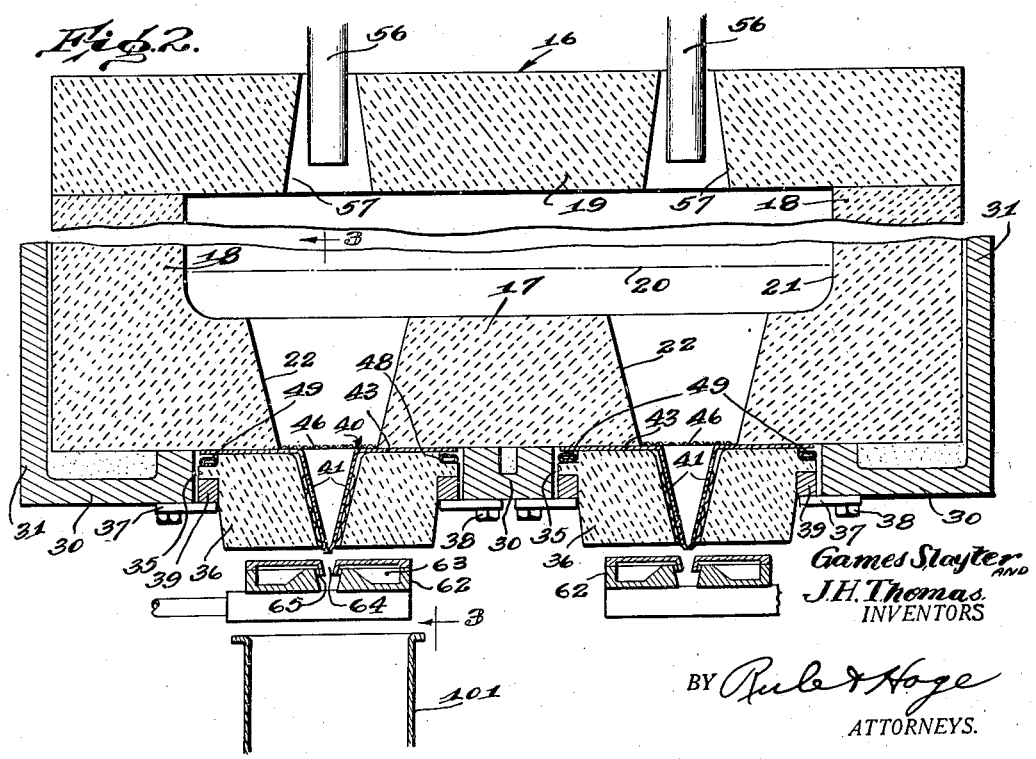
Fig. 2 is a fragmentary elevational, cross-sectional view of the fiberizing apparatus illustrated in Fig. 1, the section being taken along the line 2—2 thereof.

A further means contributing to the uniform temperature conditions required at the feeder outlets, is provided by a series of burners 56 (Figs. 1 and 2), one for each feeder, located above the roof 19 and arranged to direct heating flames downwardly through the passageway 57 so that the flames or hot gases are caused to impinge on the supply body of glass 20. The heating of the glass due to the burners is localized to a certain extent, each burner directing its flame against the glass directly over a corresponding well 22. Valves 58 are manually adjustable to regulate the amount of heat supplied by each burner.

In this manner the temperature of the glass at all of the outlets or wells 22 can be maintained substantially equal, the greatest amount of heat being supplied to points more remote from the furnace tank and which would otherwise be at a lower temperature than the glass near the tank. These burners also cooperate with the electrical heating means for maintaining a practically equal temperature of all the stream of glass at their points of issue. This temperature may also be maintained constant during operation, or raised or lowered, as may be required, by adjusting the current flow as hereinafter described.

In the manufacture of matted glass wool and like products, simultaneous production of fibers varying somewhat in diameter may be produced by providing a slight variation in the temperatures at the different feeder outlets, permitting the other characteristics to remain substantially constant. Similar results may be obtained, if desired, by slight variation in the size of the different outlets. Ordinarily, however, like temperatures are maintained for each of the outlet orifices in order to produce a uniform product and to this end the burners 56 and the temperature regulating means 55 cooperate to provide uniform temperature conditions at each of the outlet orifices regardless of its position relative to the other outlet orifices. If desired, of course, a product composed of varying diameters of wool may be produced by adjusting the temperatures at the outlet orifices to produce this result.

The blowers by which the streams of glass are drawn into fine fibers or filaments will now be described. These blowers 62 are individual to the feeders 40, being positioned directly beneath and spaced a short distance from the feeder outlets. Each blower (see Figs. 4 and 5) provides a pair of pressure chambers 63 extending lengthwise of the blower, the inner walls 61 of each of the chambers being spaced apart to provide a longitudinal slot or passageway 64 through which the streams of glass descend. The inner walls of the chamber are formed with a multiplicity of nozzles 65 or passageways through which the steam or other gas under pressure is directed from the pressure chambers into and against the glass. The two chambers separated by the slot 64, faced on each side with the jets 65, form blower units which coact with each other to attenuate the individual glass streams.

Each chamber or blower unit 63 is formed by a bottom plate 66 and a top plate 67, said plates being secured together by screws 68. Dowel pins 69 may be fixed in the lower plate 66 and project into suitable openings in the cover plate 67 to hold the said plates in accurate alignment. The skirts 71 (see Fig. 5) extending downwardly from the jets 65 form the side walls of the passageway 64 and are inclined and downwardly convergent with respect to one another. The upper portions of the skirts 71 are projected or offset outwardly as a rib beyond the plane of the lower portions thereof to form strips 72 having kerfs or slots at short intervals which, in combination with the cover plate 67 and the upper portion of the walls 61 thereof, form the nozzles 65 (see Fig. 8).

The nozzles or jets 65 on opposite sides of the passageway 64, as shown, are downwardly convergent and direct the issuing gases in downwardly convergent jets.

The series of jets on opposite sides of the slot 64 are registered against each other so that the opposite pairs of jets are directed against each other and are caused to merge into a series of spaced apart blasts separated by relatively quiescent zones into which the atmospheric gases are induced from over the top of the blowers. The nipples 45 are preferably arganged so that each stream of glass is caused to enter into the relatively quiescent zone between the spaced apart jets (see Fig. 7).

At one end of the blower a cross-bar 73 is attached to the bottom plates, holding them in spaced relation. At the other end of the blower is attached a pipe section 74, squared to fit the blower and attached thereto by bolts 75. The pipe section is formed with ports 76 which open into the pressure chambers 63.

The angles of the nozzles 65 relative to the direction of the streams of glass entering the blower are important. We have found that satisfactory results can be obtained when the angle between the glass and the impinging jets is from about 10° to 14° and preferably about 12°, the angle of convergence between the opposite edges or faces 71 accordingly being about 24° more or less. Any substantial variance beyond this critical range results in unsatisfactory operation and an inferior product. If the angle is less than about 10°, the steam blast does not obtain an effective grip on the flowing glass so that the pulling action is comparatively weak, resulting in relatively coarse fibers. On the other hand, if the angle between the impinging gas or steam in the flowing glass is greater than about 14°, the pull on the glass is also reduced. A greater angle also results in objectionable turbulence and cross-currents. This turbulence interferes with the steam jet pattern and prevents continuous and uniform pulling and attenuation of the glass to fine fibers. It also interferes with the downward suction of air which is induced through the passageway 64 by the steam blast and may cause back-drafts which carry some of the glass fibers with them. When this occurs, a portion of the upwardly moving glass may be carried back to the feeder outlets so that the latter are fouled, interfering with or stopping the stream flow of glass.

Below the blower is a receiving hood 100 (see Fig. 1) into which the steam blasts and the fibers are directed. The upper end of the hood consists of spouts 101, open at the top and slightly divergent downwardly to form a Venturi throat which serves to expand a vehicular blast and cause a deceleration. One spout 101 is preferably provided for each individual blower. The lower ends of the spouts 101 open into a common receiving chamber 102 which is also downwardly divergent adapted to decelerate the vehicular gases and permit the fibers to be deposited upon a traveling conveyor belt 103 at the lower end thereof. The belt 103 is preferably foraminous to permit the passage of the vehicular blast therethrough into a chamber 104 from where the gases are led off through a conduit 105. Suction means may be applied to the chamber 104 to assist in the formation of the mat and the discharge of the vehicular blast. If desired, tempering oils, coating materials or binding agents may be applied to the fibers as they descend and/or deposit themselves in the hood. The use of the hood, however, is sometimes unnecessary, as, for example, when producing textile filaments or thin webs for electrical insulation by the same gaseous pulling process.

The positioning of the blower with respect to the feeder outlet is important and accordingly, the blower should be mounted to permit both tilting and angular horizontal adjustment of the blower, and permit it to be adjustable up and down or in a horizontal plane with respect to the feeder. Ordinarily, satisfactory operation necessitates an exact adjustment of each blower so that it is perfectly horizontal or level and perfectly centered or registered with respect to the associated feeder. If the blower is not level, the volume of induced air entering the blower is greater on one side than the other, resulting in an unbalanced condition. This unbalance causes an accentuated turbulence of the blast along one side of the blower slot, and disrupts the desired steam jet pattern so essential for efficient operation. Moreover, if the blower is not aligned properly, there is a tendency for the individual fibers to strike against the side walls of the slot, or the skirts of the blower, causing these parts to wear away and deleteriously affect the steam pattern and the efficiency of the blower.

The vertical distance between the blower and the bushing tips may be regulated in order to produce most efficiently the desired type of wool. The vertical space between the blower and the bushing tips or nipples determines in part the velocity of the induced air, which in turn affects the amount of pull on the glass stream entering the blower, influences the amount of whip on the glass streams, and within limits, determines the temperature of the bushing at the outlet orifices, since the induced air is drawn over the tips and nipples and causes them to cool.

The distance between the blower and the bushing tips, also within limits, determines the temperature of the glass when it is acted upon by the stream.

Thus, a decrease in the vertical distance results in increased pull on the glass streams as they enter the blower, decreased temperature at the bushing tips, increased whip of the glass streams, and within limits, tends to raise the temperature of the glass at the point of steam action. The effect upon the fibers is to reduce them in diameter, and in general, causes them to decrease in average length.

On the other hand, an increase in the vertical distance results in an increased temperature in the bushing tips, decreased pull on the glass stream as it enters the blower, a decrease in whip of the glass streams, and within limits, a tendency to lower the temperature of the glass at the point of steam action. Its effect upon the glass is to increase production, produce larger fiber diameter and to produce long fibers.

Thus, the standard vertical distances may vary for different types of wool desired. For a fine quality, long fine wool for heat insulation purposes or the like, a distance of about one-eighth of an inch has been found satisfactory. For a higher production rate wherein a whipping action method is utilized to produce high production rates, a distance of about a quarter of an inch may be used. If coarse wool as for example, for air filtering purposes, is desired, a larger distance of about five-eighths of an inch or the like may be used. These distances, however are only to be used as guides and are not to be construed as limiting the present invention.

The skirts 71 of the blowers and the jets are preferably arranged to lie at an angle of about 12° from the vertical, the line of jets on opposite sides of the slots 64 being downwardly convergent, whereby the steam converging from oppositely spaced jets is caused to converge together and form new spaced apart blasts which attenuate the fibers.

This angle of about 12° (plus or minus only a few degrees) gives the proper direction to the steam when it exhausts from the slots. An increase in this angle would bring the point of intersection of the two steam jets closer to the bushings, and at the same time, the horizontal component of force exerted by the steam would be increased. These conditions would tend to have the glass stream acted upon by the steam at a point too close to the bushing and would tend to unduly restrict the entrance of the glass into the steam flow. Also as the horizontal component of the force increases, the tendency to restrict the flow of induced air into the blower becomes greater.

Conversely, should the angle be decreased, the point of action of the two steam jets would be at a greater distance from the bushings, whereby the temperature of the glass may be too low before being attenuated by the steam jets, and the steam would have unduly expanded and decelerated before acting on the glass streams, thus decreasing the downward pull exerted on the glass by the steam.

The spacing of the individual jets from each other is an important feature of the invention in that a much better operating efficiency is achieved, and a great saving in steam consumption may be effected. It has been found that by providing a multiplicity of spaced apart jets arranged in rows and causing them to converge into a series of parallel, spaced apart blasts, relatively quiescent zones exist between the adjacent blasts. It is into these relatively quiescent zones that the induced air and the streams are mainly caused to flow. Without these spaced apart quiescent zones, the glass streams find difficulty in entering into the steam blasts as there is a tendency for the glass to ride up on top of the converging blasts and accumulate there until a sufficient body has formed which will penetrate into this steam blast. They then are blasted away without being properly attenuated. Quiescent zones, however, overcome this difficulty and facilitate the introduction of induced air along with the glass streams through the quiescent zones into the steam blasts where they may be acted upon continually and uniformly with a minimum interruption of the stream flow.

The use of a multiplicity of spaced apart jets also effects a material saving in steam, in that the ejection of the steam is only required at spaced intervals, and not throughout the entire length of the slot.

It has been found that the spacing of the slots may be varied within certain limits, but that these limits ordinarily are about one-sixteenth to one-quarter inch centers, preferably about an eighth inch spacing on centers.

It has been found preferable in the practice of the present invention to provide a steam blast which is incompletely expanded. To produce this, the steam may be discharged through relatively straightsided orifices or nozzles, although other contours, such as slightly converging, rounded or the like, may also be used. As the blasts leave the nozzles, the steam continues to expand and have a lateral component of movement. Moreover, the velocity of the steam at various points along a cross-section of the blast is different. The velocity in the center of the blast is in general considerably higher than the velocity of the blast at the outer marginal fringe. This differential of speed in the lateral extending movement of the steam may serve to produce a whipping action of the glass fibers when this result is desired, as brought out more fully hereinafter.

The construction of the feeder 40 with spaced nozzles or nipples 45 is such that in cooperation with the blower, the streams of glass issuing from the nozzles are prevented from coalescing or flowing into each other. The powerful downward blast of steam from the blower nozzles causes an indraft of air downwardly through the slot 64 of the blower. This indraft of air through the narrow passageway between the top of the blower and the bushing 36 scours the nozzles 45 and prevents a flow of glass from one nozzle to another. The indraft of air at the same time may cause more or less of a circular or swirling movement of the air around each individual nozzle. This circulation of air around each individual stream of glass appears to be due in part to the directing and controlling effect of the projecting nozzles which thus cooperate with the induced draft of air to serve the important function of preventing the issuing glass from bridging across from one outlet to another.

This method of keeping adjoining streams from coalescing depends also upon the proper spacing of the blower beneath the feeder outlets. Thus, if the blower is too far below the feeder, the induced air drafts are ineffective for preventing the glass from wetting or flowing along the bottom surface of the feeder from one outlet to another in a manner to cause coalescence of the streams.

The present apparatus is adapted to produce fibrous glass wool of varying types and characteristics and at different production rates. In so doing, two distinct methods of operation are employed. The first is what is known as a straight pulling method wherein the individual glass streams emerge from the nipples and extend downwardly in straight streamline flow, such as, for example, that illustrated in Fig. 7. The attenuation of the streams is continuous and extremely fine fibrous glass, suitable for textile purposes, if desired, may be produced. When this mode of operation is employed, the steam impinges upon the glass streams and causes the latter to accelerate and approach the velocity of the steam blasts, which is generally about 70,000 feet per minute.

The other method of operation has been termed the whipping action. We have found that by properly combining an open steam blast with a proper temperature condition, viscosity and speed of feeding of the glass stream, it is possible to sharply flutter or whip the glass streams and attenuate them simultaneously along their length at a multiplicity of points and in many directions to produce an ultimate attenuation vastly greater than if the streams were pulled straight down by the steam blasts. The fiber production made possible by the whipping action method may be as high as 8 or 12 times that theoretically possible if glass streams were being attenuated straight downwardly at a velocity equal to that attained by the steam blasts.

The whipping action method has been more or less diagrammatically illustrated in Figs. 8 and 9. We will now describe the whipping action and the theory behind the causes and effects thereof. When a molten stream of glass enters into the steam blasts, it is yieldingly, although rapidly, attenuated so that it quickly attains a velocity approximating that of the steam blast itself. As the stream then proceeds further down into the blasts, there is a tendency for portions of it to move laterally and enter into a lower velocity steam blast region. This lateral movement is probably enhanced by the expanding nature of the steam blast itself and also by the inherent turbulence of the steam. Other portions of the glass stream, however, tend to remain in the high speed regions and actually pass the first mentioned portions which have entered into the lower speed regions. A loop or zigzag is now present in the glass stream. As this loop is further attenuated, it will be noted that the glass stream is simultaneously being attenuated on each side of the loop so that a double attenuation is achieved. Instead of having a single loop, however, with merely a double attenuation, it is possible to have a high number of loops with a consequent multiplication of the attenuations. Moreover, the loops do not remain in a simple formation but are formed in all directions in as many places along the fiber length simultaneously. The result is that the streams are attenuated by the steam blasts simultaneously at many points along the length thereof.

The turbulence of the steam and the degree of whipping may actually be so high as to pull portions of the stream to extreme fineness or nothingness, thus causing a severance in stream flow. However, because of the original small diameter of the streams, they are not atomized or caused to branch into a multiplicity of shorter fibers, in which case the fibers would have slugs attached thereto as is common in the conventional method of atomizing slag into mineral wool. On the contrary, each portion of the glass stream along its length yields but one portion of a fiber even though the stream may actually be pulled apart along its length into a series of fine fibers.

In order for the whipping action to be attained, we have found that the following conditions should prevail. Not only should the steam blasts be of the nature and in the pattern mentioned hereinabove, but also the glass streams should be sufficiently fluid and hot so that the glass will be fed into the blasts at a higher rate than with the straight pulling method and thereby provide for the total attenuation, i. e., a sufficient quantity of glass must be fed to produce the desired amount of glass wool with its ultimate fiber diameter.

From another point of view the glass streams must be fed with sufficient rapidity to permit them to be attenuated and looped, without causing them to be continually pulled to excessive fineness and severed.

Moreover, the glass must be sufficiently hot that it will remain plastic throughout the whipping range which may exist for some inches below the blower. If the glass is fed at too low a temperature into the blast, the latter will chill and freeze the glass so that any further pulling or whipping will not cause an attenuation. In practice it has been found that a temperature range of about 2300° F. to about 2700° F. is desirable for ordinary soda-lime glasses or for glasses having more or less similar viscosity characteristics. These temperatures, it will be noted, are in proximity to the devitrification point of these glasses. Lower temperatures, of course, may be used with lower melting glasses, such as lead glass. The higher the temperature within reasonable limits, the greater will be the effect of the attenuation due to the whipping. On the other hand, if it is desired to produce a straight pulling operation wherein extremely fine, long and substantially endless lengths of fine filaments are required, a lower temperature of glass is used and less induced air permitted to be drawn into the blast. A lower steam velocity may also be used, especially if skirts 71 of the blower are lengthened in order to increase the contact of the steam against the individual glass filaments.

The whipping action may be observed by referring more especially to Fig. 9 which is a partial reproduction of a spark photograph illustrating the whipping action. For the sake of clarity, only a few of the fibers have been shown in the whipping range, but it is to be understood that it is possible and preferable to produce a large number of these fibers in close proximity to and simultaneously with one another. In Fig. 9 molten streams 95 flow through the outlet nipples 45 into the blasts issuing from the spaced jets in the blower 62. One stream 95ᵃ only will be described. As the stream 95ᵃ strikes the blast, a portion of it is pulled downwardly into a loop 96. A succeeding portion 97 of the same stream, however, may not be influenced in the same degree by the blast, but may tend to remain in a more quiescent state for an infinitesimal fraction of a second near the blower. As the loop 96 is further attenuated, both sides thereof are being drawn into a fine fiber. Simultaneously with the attenuation of the loop 96 may be the formation of a series of loops 98, all of which are pulled to an exceedingly high degree of attenuation. This condition is carried on throughout the whipping range and with all the streams simultaneously to produce a total attenuation far greater than would be even theoretically possible if the streams attained the full velocity of the stream blasts and were pulled down straight. The above example is not intended to be a limitation of the present invention, but merely an elucidation and attempted explanation of the startling beneficial effects of the whipping action.

Modifications may be restored to within the spirit and scope of the appended claims.

We claim:

1. A feeder for molten glass comprising a downwardly converging trough terminating at the lower end in a bottom portion formed with a plurality of channels or passageways extending therethrough and terminating in closely adjacent outlet orifices, the inner contours of said outlets being rounded to provide streamline flow of glass therethrough and said channels consisting of a material which is wetted by the glass flowing therethrough, said material presenting exterior surface portions bridging the spaces between said outlets, and said bottom portion having indentations between the individual outlet surfaces for preventing the adjacent streams of glass which are flowing through said outlets from bridging or flowing over said surface portions from one outlet orifice to another and causing the streams to coalesce.

2. The combination of a container for a supply body of molten glass having a plurality of openings through the floor thereof, feeders mounted at said openings comprising electrical conducting material, said feeders each having a multiplicity of outlets through which molten glass is caused to issue from the container, means for electrically connecting the feeders in series, and means for supplying electric current through the feeders and thereby heating the walls of said outlets substantially identically to maintain the issuing streams of glass at equal temperatures and viscosities whereby substantially uniform streams flow from all said outlets.

3. The combination of a refractory container for a supply body of molten glass having openings through the floor thereof, a plurality of feeders made of electrical conducting material, said feeders mounted at said openings and each provided with a series of apertures through which molten glass flows from the container, means for electrically connecting the feeders in series, and means for supplying an electric current through the feeders and thereby heating the feeders substantially identically to maintain the issuing streams of glass at equal temperatures and viscosities and thereby obtain substantially uniform stream flow from the apertures of all said feeders.

4. The combination of a refractory container for molten glass having openings through the floor thereof, a plurality of feeders made of electrical conducting material, said feeders mounted at said openings and each provided with a series of apertures through which molten glass flows from the container, means for electrically connecting the feeders in series, and means for supplying an electric current through the feeders and thereby heating the feeders substantially identically to maintain the issuing streams of glass at equal temperatures and viscosities, said connecting means comprising laminated connectors, each including a plurality of nested sheet metal conductors.

5. The combination of a container for a supply body of molten glass, the floor of the container consisting of refractory material and formed with wells extending therethrough, feeders mounted beneath said wells, each feeder consisting of sheet metal formed with a multiplicity of outlet openings therethrough for the passage of molten glass, and means for flowing an electric current through the feeders in series and thereby heating the walls of the feeder outlets in the respective feeders substantially uniformly throughout the vicinity of the openings to maintain the issuing streams of glass at identical temperatures and viscosities and thereby obtain a substantially uniform stream flow from all said outlets.

6. Apparatus for producing a multiplicity of glass fibers having substantially identical diameters which comprises, a container for a body of molten glass, a plurality of feeders closely spaced from one another in the floor of the container, each feeder being formed with a plurality of outlet openings therethrough, and temperature regulating devices associated with said container and individual to said feeders for regulating the temperature of the glass within the zones of the respective feeders, said temperature regulating devices comprising burners mounted over and directed against said body of glass in register with said feeders.

7. Apparatus for producing a multiplicity of glass fibers having substantially identical diameters which comprises, a container for a body of molten glass, a plurality of feeders closely spaced from one another in the floor of the container, each feeder being formed with a plurality of outlet openings therethrough, means for heating the feeders equally and thereby controlling the temperature of the glass flowing through the outlets, and separate means associated with said container and individual to the feeders for locally applying heat to the glass within the zones of the respective feeders, said separate means comprising burners mounted over and directed against said body of glass in register with said feeders whereby each of said feeders is supplied with glass at substantially the same temperature.

GAMES SLAYTER.
JOHN H. THOMAS.